United States Patent Office 3,143,031
Patented Aug. 4, 1964

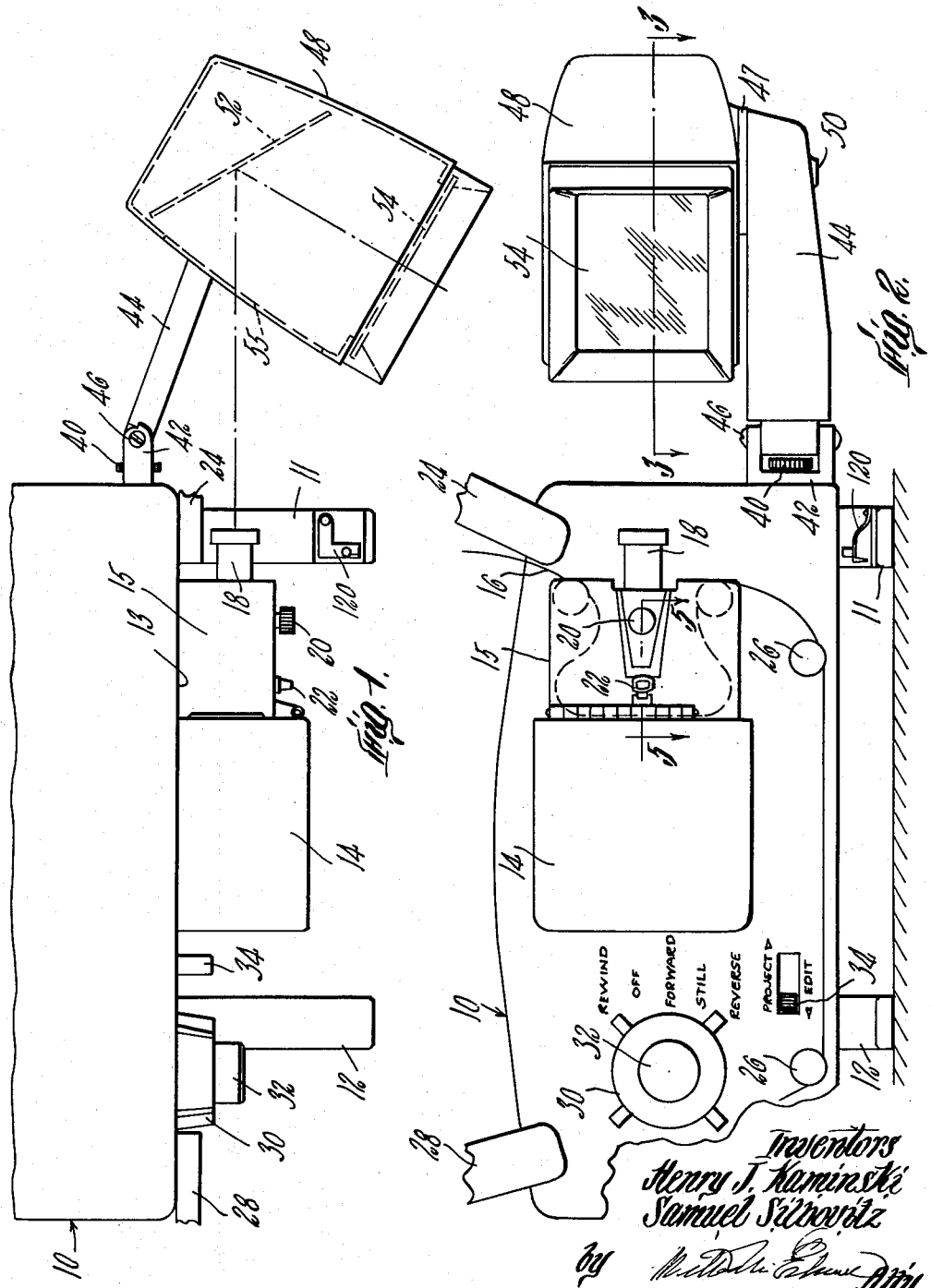

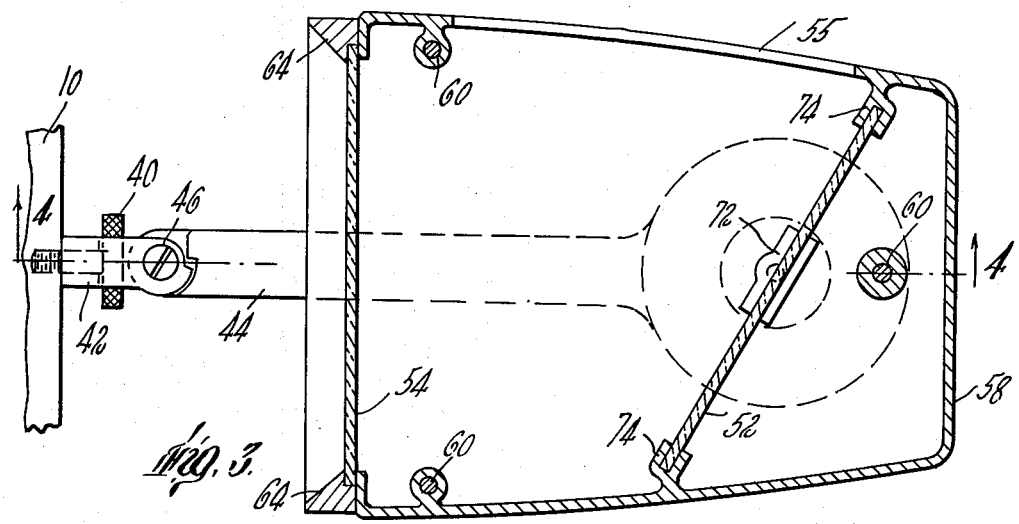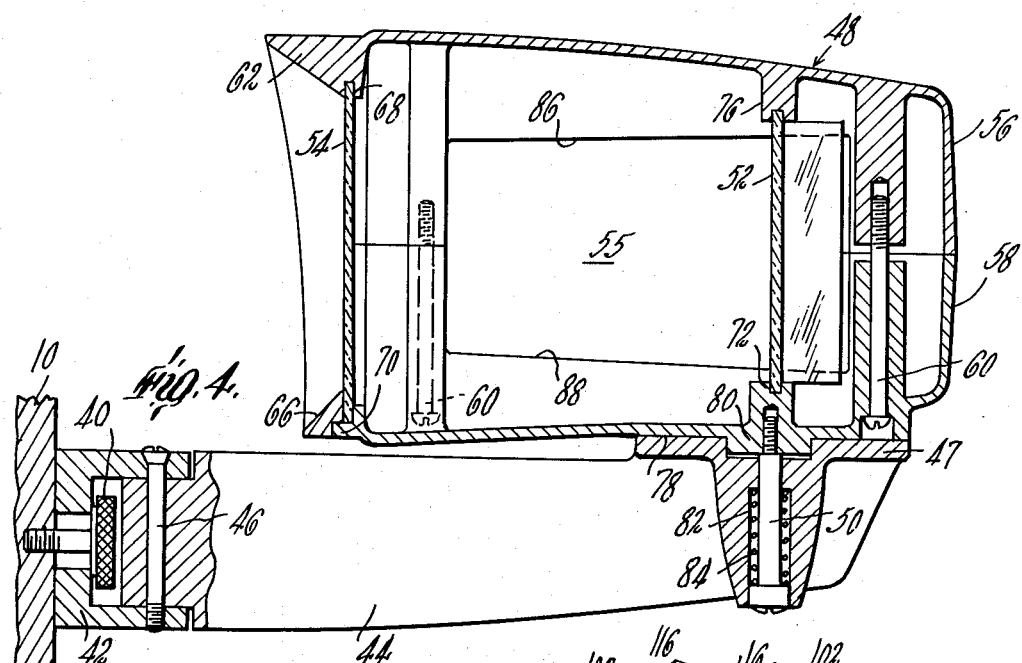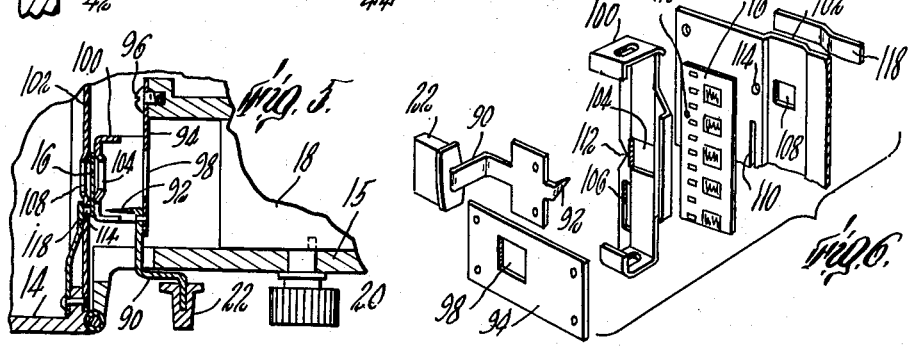

3,143,031
EDITING MOTION PICTURE PROJECTOR
Henry J. Kaminski, Hingham, and Samuel Silbovitz, Quincy, Mass., assignors to Keystone Camera Company, Inc., Boston, Mass., a corporation of Massachusetts
Filed July 21, 1961, Ser. No. 125,817
4 Claims. (Cl. 88—16)

This invention relates to motion picture projectors and more particularly to a novel and improved accessory adapted to be attached to such projectors to facilitate the viewing and/or editing of film.

It is frequently desirable to view motion picture film quickly and easily. However, the heretofore available methods involve either the use of a conventional motion picture projector in conjunction with a separate screen spaced at a distance from the projector on which the images are projected for viewing in a darkened room, or in the case of editing operations a separate apparatus which permitted individual frames to be perused and identified for subsequent desired operations. The latter arrangement is particularly useful where it is desired to preview an exposed film and add, delete or rearrange portions thereof so that a final arrangement satisfactory for the intended purposes may be achieved. Certain portions may be deleted due to the fact that they were improperly exposed, or they involve a series of images not desired in the particular sequence which occurred as the film was exposed, for example, and other portions might be added, as legends, for example. Therefore it is often desirable to preview the film to determine whether any such situations exist, and if they do, to edit the film, removing undesired portions and rearranging other portions to provide the desired sequence of images. The devices heretofore principally used for previewing purposes have been separate apparatus employing a rotating prism arrangement or a shutter which enable the individual frames of the exposed film to be viewed serially and any portions which were to be removed or rearranged to be identified during the viewing operation. However, this type of previewing arrangement has certain disadvantages, among these being the fact that an extra piece of equipment in addition to the projector is required, and in the case of prism arrangements certain distortions in the displayed images are introduced so that the displayed images do not have the same quality as do images projected by the lens and shutter system in the conventional motion picture projection apparatus. In addition neither the projectors nor the editors were particularly adapted to a simple viewing operation where a person might like to quickly view a film after the film has been edited without the need to set up a screen and to darken the room.

Accordingly, it is an object of this invention to provide a novel and improved motion picture viewing apparatus.

Another object of the invention is to provide a novel motion picture viewer arrangement which may be easily attached to a conventional motion picture projector and used for viewing the film without the necessity of darkening the room.

Another object of the invention is to provide a film previewing and editing apparatus which utilizes the projection system of a motion picture projector.

Still another object of the invention is to provide a novel and improved film previewing and editing system incorporating a compact and inexpensive viewer arrangement that is attachable to a motion picture projector which includes modifications which enable portions of the film to be identified as they are being viewed and also light source and lens system adjustments to accommodate the viewer arrangement.

A further object of the invention is to provide in a motion picture projector a novel film marker arrangement which enables specific portions of the film to be identified for editing purposes.

In accordance with principles of the invention there is provided a viewing accessory which may be attached to the frame of a conventional motion picture projector. That accessory includes a housing, a reflecting surface mounted within the housing at one end thereof and a translucent viewing screen positioned at the other end thereof. This housing structure is pivotably supported on an arm that is releasably secured to the projector frame and is positionable so that when the film is fed through the projector in the normal operating manner, light rays modified by the images on the film are passed through the projector's high quality optical system, impinge on and are reflected by the mirror onto the viewing screen. As this viewing screen is positioned in the immediate vicinity of the projector the controls of that machine may be employed to control the projected images as desired for ordinary viewing or for the previewing and editing function. In the preferred embodiment these controls include a light intensity control, a focusing control for the comparatively short focal length required for this viewing operation, and a film drive control which enables the film advance to be stopped without turning off the light source. In addition, a novel film marking apparatus is built into the projector between the aperture plate and lens system so that exact areas of film may be identified. The marking arrangement is a compact, easily operated unit which enables a particular portion of film to be accurately identified in an editing operation without impairing conventional viewing operation of the projector. Any necessary film cutting and splicing equipment is easily associated with the projector system and hence the invention provides a compact previewing and editing system including a viewing attachment which may be easily secured to the projector and used in conjunction therewith to provide an image of excellent fidelity for simple viewing or for previewing and editing purposes.

Other objects, features and advantages of the invention will be seen as the following description of a preferred embodiment thereof progresses, in conjunction with the drawings, in which:

FIG. 1 is a top view of the motion picture film projector with the viewing accessory attached thereto;

FIG. 2 is an elevational view of the motion picture projector and viewing accessory shown in FIG. 1;

FIG. 3 is a sectional view through the viewing accessory housing taken along the line 3—3 of FIG. 2;

FIG. 4 is a sectional elevational view of the viewing accessory taken along the line 4—4 of FIG. 3;

FIG. 5 is a sectional view showing the film marking apparatus utilized in the projector taken along the line 5—5 of FIG. 2; and FIG. 6 is an exploded view of the components of the film marking apparatus and a portion of the film indicating the nature of the marking provided by the marking apparatus.

There is shown in FIGS. 1 and 2 a motion picture projector having a frame 10 which is supported on front and rear legs 11 and 12. Mounted on the side wall 13 of the frame is a light source housing 14 and lens unit support structure 15 which is hingedly attached to the light source housing so that it may be pivoted outwardly for easier removal of the film 16 through the gate structure between the light source and the lens system. A lens unit 18 is mounted in the structure 15 and also associated with that structure a focusing control knob 20 and an editer marker handle 22. A conventional shutter (not shown) is utilized to control the impingement of light on the film during operation of the projector. The projector includes an automatic threading arrangement in which the film is supplied from a feed reel (not shown) which is mounted on arm 24 and after it is guided through the gate the film is passed over rollers 26 to be wound on a takeup reel (not shown) which is mounted on arm 28 in conventional manner. The film 20 is intermittently advanced by suitable means such as a claw through the gate between the light source 14 and the lens system 18 so that images formed on the film may modify the projected beam of light and the resulting radiation passing through the lens system may reproduce those images. As the projector structure in general may be conventional in nature, it is not shown in greater detail. A master control switch 30 and a speed control rheostat 32 are mounted coaxially on the projector case side wall. The switch 30 controls the application of power to the light source, projector film drives and the direction of operation of that drive and also includes a "still" position at which the film is not advanced but the light source remains on so that a particular frame may be observed. Also mounted on the projector wall is an "edit-project" control switch 34 which in its forward (project) position produces an intensity of lumination from the light source 14 of a level sufficient for normal projection operations and in its rearward (edit) position produces a reduced level of lumination from the light source by reducing the voltage applied thereto as the magnitude of illumination required for editing is not as great due to the location of the viewing screen and also so that the life of the light source element may be prolonged.

Releasably secured on the front wall of the projector case 10 is the previewing accessory which is fastened to the frame by a knurled captive screw arrangement 40 secured in bracket 42. The bracket 42 thus is fixed in position on the frame 10 and supports arm 44 which is pivotably secured to the bracket 42 by means of a bolt 46. The opposite end of the arm 44 has a cylindrical seating flange portion 47 which includes a horizontal surface which mates with and supports a cooperating surface on the bottom of housing 48. The housing is secured to the arm 44 by means of a bolt 50 in a manner which allows it to be pivoted in a horizontal plane to the desired position.

Mounted within the housing 48 adjacent the rear end thereof is a reflecting mirror structure 52 and at the forward end of the housing remote from the reflecting mirror and disposed pependicular to the axis of the housing in a translucent viewing screen 54. An aperture 55 is provided in the side wall of the housing nearer the projector through which light rays pass for reflection by the mirror onto the viewing screen 54.

More detailed views of the viewing accessory are shown in FIGS. 3 and 4. The accessory housing includes complementary top and bottom members 56 and 58 which are secured together with bolts 60 as indicated in FIG. 4. The top member 56 includes a viewing frame portion which positions the translucent screen 54 at the forward end thereof. That frame comprises an overhanging top rib 62, side ribs 64 and a base rib 66, all of which form a framework which extends forwardly of the screen 54 and shades that screen from a substantial fraction of incident light which might impair the viewing operation. A slot 68 in the top rib 62 is provded into which the top edge of the screen 54 is received, and the other peripheral portions of the screen are secured between the ribs 64, 66 and cooperating surfaces of the bottom viewer housing member 58. The bottom member 58 includes a forwardly extending lip 70 on which the viewing screen 54 is supported and which mates with the bottom rib 66 of the viewer frame. The mirror 52 is also secured in slots formed in the viewer housing members, the bottom of the mirror 52 being supported on a centrally located floor slot 72 disposed at an angle of 45° to the main axis of the housing, the sides of the mirror being secured in corresponding located wall supported slot members 74 in the bottom member 58 and the top edge in a downwardly extending slotted structure 76 which is molded into the top viewer housing member 56. The lower surface of the housing member 58 includes a flat surface 78 which cooperates with the flange portion 47 on the arm 44 to support the viewer housing in preferred location. This arrangement permits the viewer housing to be rotated in a horizontal plane with respect to the arm 44. (Adjustability in other degrees may be provided if desired.) The bolt 50 is threaded into a boss 80 in the lower housing and extends through an oversized bore 82 in the arm 44 in which a biasing spring 84, which surrounds the bolt 50, exerts resilient force between the bottom of the bore 82 and the head of the bolt 50 so that the surface 78 is maintained in firm engagement with the flange. Each housing member may be molded from a high impact styrene for example. Each of the two members 56, 58 has a cutout portion 86, 88 in their side walls so that when they are assembled an aperture 55 is formed in one side wall of the viewer housing through which the projected rays from the light system may pass to be reflected by the mirror 52 for impingement of the screen 54.

A firm marking unit for editing purposes is built into the film gating area between the light source 14 and the lens system structure 15. As best shown in FIGS. 5 and 6 this marking unit includes the handle portion 22 that is secured to one end of a formed metal strip 90 which extends through the wall of the lens support structure 15 and has a piercing point 92 formed in the end thereof opposite from the handle, which point is disposed generally perpendicularly to the direction of movement of the film 16 through the gating area. This piercing element is secured to a spring support plate 94 which is in turn secured by suitable means such as screws 96 to an inner wall of the lens structure unit 15. The support plate 94 has an aperture 98 in it through which light rays pass. A pressure plate 100 is suitably secured to the lens structure unit 15 and is arranged so that when the unit is in normal position the face of the pressure plate is resiliently biased against the film 16 to aid in the positioning and guiding of the film relative to the aperture plate 102 that is secured to the light source housing 14. The pressure plate 100 has a first substantially square aperture 104 for light rays and a second elongated aperture 106 which is adapted to accommodate the claw mechanism utilized to engage the sprocket holes in the film 16 and produce the desired intermittent advance of the film 16. The aperture plate 102 has the main aperture 108 which controls the amount of light that is permitted to impinge on the film images and a corresponding elongated aperture 110 to which the claw mechanism operates to advance the film as desired. In addition there is in the pressure plate 100 a notch 112 which accommodates the piercing point 92 of the perforator and in the aperture plate a circular hole 114 through which the piercing point passes when the marking unit is operated to place an indication on the film as indicated at point 116 in FIG. 6. A flat resilient spring strip 118 of beryllium copper, positioned immediately behind the hole 114 in the aperture plate, normally maintains that hole tightly closed. However, the strip 118 is sufficiently flexible so that when the marker handle 22 is moved rearwardly the piercing point 92 passes through the notch 112 and the film 116 into the hole 114 against the strip 118 at which time the strip will flex so that a clearly detectable mark may be placed on the film.

In the operation of the system the film 16 is automatically inserted through the projector in normal fashion as if developed images on the film were to be displayed in the conventional manner on a remotely located screen. The viewer attachment is secured to the projector and is positioned so that light rays from the projector impinge on the mirror 52 and are reflected therefrom onto the translucent screen 54. Through adjustment of the focusing knob 20 the tubular lens unit is moved toward or away from the light source so that a well-defined projected image is formed on the screen 54. The project-edit switch 34 is placed in the "edit" position so that the intensity of the light emanating from the source is reduced. The master control switch 32 is then moved to the "forward" position and the images on the film are projected for display on the translucent screen immediately adjacent the operator of the projector. When a portion of the film is reached which is desired to be marked for editing purposes the master control switch is moved to the "still" position in which position the advance of the film is halted but the light source is not turned off. In this position the particular image of interest on the film may be carefully viewed and if it is desired to be marked for future reference the marker handle 22 is moved rearwardly to force the piercing point 92 through the film and to provide a precise indication of the location of that image. Upon release of the marker handle the piercing point springs forwardly away from the film as carried by spring plate 94 and the auxiliary hole 114 in the aperture plate 108 is closed by the spring 118 so that normal editing and/or projecting operations may proceed when the master control switch 32 is again moved to the "forward" position. In addition if it is desired to view portions of the film in the normal manner of projections on a remote viewing screen the viewer attachment is easily swung out of the line of ray projection from the lens system, the project-edit switch 34 moved to the "project" position and the images may then be viewed in the normal fashion. Thus with this simple apparatus a person may preview a film with all the color and brilliance which would be normally available if the image was projected on the movie screen without the need of setting up a large screen or darkening the room. There is no loss of picture quality or brightness which normally accompanies use of a prism type of film editing mechanism. There may be combined with the projector unit all the facilities that are normally required for editing of the film. In addition to the film movement control and marking apparatus a suitable film cutter 120 may be mounted on leg 11, and utilized to sever the film as desired and a suitable splicing kit may be provided with the projector for making the necessary splices which accompany deletions as rearrangements of film portions.

While a preferred embodiment of the invention has been shown and described certain modifications thereof will be obvious to those skilled in the art and therefore it is not intended that the invention be limited to the disclosed embodiment or to details thereof and departures may be made therefrom within the spirit and scope of the invention as defined in the claims.

We claim:

1. In combination, a motion picture projector including a frame, a light source, a lens and shutter system, film guiding means including a light controlling aperture for guiding motion picture film between said lens and shutter system and said light source so that light rays from said light source modified by images formed on said film may be projected through said lens system, a marking aperture adjacent said light controlling aperture in said film guiding means, and film marking means including a piercing element supported adjacent said film guiding means, a resilient support structure permitting movement of said piercing element toward and through motion picture film disposed on said film guiding means adjacent one margin thereof for placing a permanent indicium thereon, and means secured adjacent said film guiding means and said marking aperture preventing any light from said light source from entering said lens system through said marking aperture, and a viewing apparatus attached to said projector frame, including releasable means to secure said viewing apparatus to the front of said projector frame forwardly of said lens system, a viewer housing supported from said securing means, a translucent image forming surface defining a front wall of said housing, an aperture in a side wall of said housing adjacent said image forming surface, and a reflecting surface in the rear portion of said viewer housing mounted at an angle to said image forming surface such that said modified light rays projected through said lens system may pass through said aperture for impingement on said reflecting surface and reflection therefrom onto said image forming surface so that images formed on said film may be projected and viewed.

2. In combination, a motion picture projector including a frame, a light source, means to control the intensity of light radiated by said source, a lens system including a lens unit and a lens unit support, a shutter mechanism, film guiding and advancing means for guiding motion picture film between said lens system and said light source in an intermittent advance in coordination with the operation of said shutter mechanism so that light rays from said light source as modified by images formed on said film each time the advance of said film is stopped may be projected through said lens system, said film guiding means including an aperture plate having a light controlling aperture and a marking aperture across which the film is moved by said advancing means, means to control said film advancing means, means to move said lens unit within said lens unit support for image focusing purposes, film marking means disposed adjacent said film guiding means for placing an identifying indicium on the film adjacent the image frame currently being projected, said film marking means including an apertured resilient support plate secured to said lens unit support and adapted normally to extend parallel to the plane of the film when the film is positioned in said guiding means, a film marking element secured to said support plate including a piercing point aligned with said marking aperture and disposed generally perpendicularly to said support plate and projecting toward the film so that when said marking element is moved toward and through the film the point enters said marking aperture, and a resilient strip secured adjacent said aperture plate and normally disposed in intimate contact with said aperture plate to prevent passage of said light from said source through said marking aperture, and a viewing apparatus attached to said projector frame, including releasable means to secure said viewing apparatus to the front of said projector frame forwardly of said lens system, a viewer housing supported from said securing means, a translucent image forming surface defining a front wall of said housing, an aperture in a side wall of said housing adjacent said image forming surface, and a reflecting surface in the rear portion of said viewer housing mounted at an angle to said image forming surface such that said modified light rays projected through said lens system may pass through said aperture for impingement on said reflecting surface and reflection therefrom onto said image forming surface for viewing images formed on said film and portions of the film requiring editing as detected by the display on said image forming surface may be identified by said film marking means.

3. In combination, a motion picture projector including a frame, a light source, a lens system including a lens unit and a lens unit support, said lens unit being movable within said lens unit support for image focusing purposes, a shutter mechanism, film guiding and advancing means for guiding motion picture film between said lens system and said light source in an intermittent advance in coordination with the operation of said shutter mechanism so that each time the advance of said film is stopped light rays from said light source as modified by images formed on said film may be projected through said lens system, said film guiding means including an aperture plate having a light controlling aperture and a marking aperture across which the film is moved by said advancing means, film marking means disposed adjacent said marking aperture for placing an identifying indicium on the film adjacent the image frame currently being projected, comprising a piercing element supported adjacent said film guiding means and aligned with said marking aperture, and a support structure permitting resilient movement of said piercing element toward and through motion picture film adjacent one margin of the image to be identified, and a resilient strip secured adjacent said aperture plate and normally disposed in intimate contact with said aperture plate to prevent light from passing through said marking aperture except when said piercing element is operated to mark the film, and a viewing apparatus attached to said projector frame, including releasable means to secure said viewing aparatus to the front of said projector frame forwardly of said lens system, a viewer housing supported from said securing means, said viewer housing including a translucent image forming surface defining the front wall thereof, an aperture in the side wall adapted to be positioned nearest to said lens system, and a vertically disposed reflecting surface adjacent the rear wall, said reflecting surface being mounted at an angle to said image forming surface whereby modified light rays projected through said lens system may pass through said side wall aperture for impingement on said reflecting surface and reflection therefrom onto said image forming surface for viewing said film images immediately adjacent said projector where said film marking means may be operated to identify portions of the film requiring editing as detected by the display on said image forming surface.

4. Motion picture film editing apparatus comprising, in combination, a motion picture projector including a frame,
a light source mounted on said frame,
means to control the intensity of light radiated from said source,
a lens system including a lens unit support and a lens unit movably mounted within said lens unit support for focusing purposes,
said lens unit defining an optical path,
a shutter mechanism positioned between said light source and said lens system,
film guiding means including an aperture plate rigidly mounted on said frame and a resiliently mounted pressure plate for guiding motion picture film between said lens system and said light source,
said aperture plate and said pressure plate each having a light controlling aperture aligned with said optical path,
and a marking aperture in said aperture plate,
motor driven film advancing means for imparting an intermittent advancing motion to the film in coordination with the operation of said shutter mechanism so that light rays from said light source as modified by images formed on film each time the advance of said film is stopped may be projected through said lens system,
means to control the speed of said film advancing means,
film marking means disposed adjacent said film guiding means for placing an identifying indicium on the film adjacent the image frame currently aligned with said light controlling aperture including a resiliently mounted rearwardly projecting piercing element mounted forwardly of said aperture plate,
means to move said piercing element rearwardly toward said light source for movement through said film and said marking aperture to perforate said film,
and baffle means disposed over said marking aperture to prevent the passage of light from said source through said marking aperture from entering said lens unit,
attachment means on said frame for receiving a viewer accessory,
and a viewer releasably secured to said attachment means including a translucent image forming surface,
an aperture portion positioned adjacent said lens system,
and a reflecting surface mounted at an angle to said image forming surface whereby modified light rays projected through said lens system pass through said aperture portion and are reflected by said reflecting surface onto said image forming surface for forming a visual image.

References Cited in the file of this patent

UNITED STATES PATENTS

| 1,731,733 | Antonelli | Oct. 15, 1929 |
| 2,168,761 | Caldwell | Aug. 8, 1939 |
| 2,218,256 | Bechtel | Oct. 15, 1940 |
| 2,343,850 | Fairbanks et al. | Mar. 7, 1944 |
| 2,551,482 | Wolk | May 1, 1951 |
| 2,685,817 | Freeman | Aug. 10, 1954 |
| 2,712,266 | Cherouvrier | July 5, 1955 |

FOREIGN PATENTS

| 665,136 | Great Britain | Jan. 16, 1952 |